(12) United States Patent
Madden (10) Patent No.: US 7,040,670 B2
(45) Date of Patent: May 9, 2006

(54) COUPLING APPARATUS

(75) Inventor: Kenneth Madden, Candia, NH (US)

(73) Assignee: Parker & Harper Companies, Inc., Raymond, NH (US)

( * ) Notice: Subject to any disclaimer, the term of this patent is extended or adjusted under 35 U.S.C. 154(b) by 0 days.

(21) Appl. No.: 10/733,786

(22) Filed: Dec. 11, 2003

(65) Prior Publication Data

US 2005/0127669 A1 Jun. 16, 2005

(51) Int. Cl.
*F16L 17/00* (2006.01)
(52) U.S. Cl. ............... 285/376; 285/902; 285/401; 285/307; 285/360
(58) Field of Classification Search ............ 285/376, 285/307, 308, 360, 902, 374, 399–403

See application file for complete search history.

(56) References Cited

U.S. PATENT DOCUMENTS

| 2,795,438 | A | * | 6/1957 | Oetiker ................. 285/308 |
| 2,952,480 | A | * | 9/1960 | Marason et al. ......... 285/276 |
| 3,100,655 | A | * | 8/1963 | Work .................... 285/401 |
| 3,141,135 | A | * | 7/1964 | Amlinger et al. ....... 455/321 |
| 3,585,910 | A | * | 6/1971 | Brown et al. ........... 404/69 |
| 3,986,734 | A | * | 10/1976 | Davis ................... 285/139.1 |
| 4,313,626 | A | * | 2/1982 | Duncan ................ 285/402 |

* cited by examiner

*Primary Examiner*—Aaron Dunwoody
(74) *Attorney, Agent, or Firm*—David & Bujold, P.L.L.C.

(57) ABSTRACT

The present invention relates to an alternative pipe coupling apparatus, to conventional tapered screw threads usually used to join ends of pipe sections to fixtures. The invention utilizes a bayonet style interlocking arrangement having a male element and a female element which join together and are opposingly biased against one another by a spring-like retaining ring to ensure an appropriate rigid and leak-proof connection between two elements.

10 Claims, 7 Drawing Sheets

COUPLING APPARATUS

FIELD OF THE INVENTION

The present invention relates to an apparatus for pipe fitting which prevents leakage and ensures a rigid connection between either a section of pipe and a fitting, for example a valve body, or even between separate pipe sections themselves. More specifically the present invention relates to an alternative to conventional tapered screw threads usually used to join ends of pipe sections to fittings and, in particular, a bayonet style interlocking arrangement having a male element and a female element which join together and are opposingly biased against one another by a spring-like retaining ring to ensure an appropriate rigid and leak-proof connection between two elements.

BACKGROUND OF THE INVENTION

The use of taper-threaded pipe and fittings is standard practice in the construction of small diameter (generally, ¼ inch through 2 inch) piping systems. The tapered screw thread gives rise, as the joint is tightened, to interference between the pipe and fitting that acts to prevent leakage and assure a rigid connection.

Lengths of pipe and associated fittings may be screwed together "by hand" until the imaginary conical pitch surfaces of the male and female threads meet. Further tightening, ranging from one half to one full pitch of the thread is then necessary to create sufficient interference between the threads to complete assembly of the joint. Although this method of construction provides a strong mechanical connection and one that can be made leak-tight, it has shortcomings that make its use troublesome in certain situations.

The geometry of taper pipe threads is governed by a pair of gauges, a ring gauge for male threads and a plug gauge for female threads. An acceptable thread is one that falls between one turn short of the gauge plane and one turn beyond the gauge plane, an axial span of two times the thread pitch. As a result, the overall length of a piping assembly can vary over a span of four times the pitch of the thread (2 times the pitch for the male thread, 2 times for the female) for every joint.

For example, the pitch of U.S. standard 1 inch pipe thread is 0.087 of an inch, the variability in length of an assembly of 1 inch pipe and fittings, therefore, is 0.087 of an inch×4 equals 0.35 of an inch per joint, this without considering the probability of further variation arising from tightening of the joints.

The high degree of uncertainty in predicting the completed length of piping assemblies poses a serious problem in situations wherein a piping a subassembly must meet mating connections at fixed positions within a piping system.

A further problem is encountered when a taper thread fitting, for instance a valve, is to be assembled into a piping system so that the stem will reside in a certain position when the assembly is completed. To accomplish this, the fully tightened condition must be achieved just as the stem arrives in the desired position. Unfortunately, with conventional taper threaded pipe and fittings, the coincidence of full pipe "makeup" and proper positioning is entirely happenstance.

Fittings are customarily over-tightened in an effort to achieve a desired orientation, resulting in possible damage including stripping of the threads. Under-tightening invites leakage and inadvertent repositioning (usually loosening) of the fitting through normal use.

Assembly of taper-thread piping requires the application of considerable torque to achieve sound joints. Application of the necessary torque can be detrimental to other components of the system that must provide a reaction to oppose the applied torque. Furthermore, applying this torque requires use of large tools that are difficult to maneuver in confined areas.

Also cutting pipe threads in a section of pipe, or in a fitting requires a substantial amount of material, i.e., the wall thickness of the pipe must be sufficient to allow for thread cutting without significant weakening of the pipe. In certain cases where thin walled pipe could be used, for example in relative lower pressure systems, a heavier gauge, and more expensive, pipe must be used solely for the purpose of supporting the thread cutting.

OBJECT AND SUMMARY OF THE INVENTION

Wherefore, it is an object of the present invention to overcome the above mentioned shortcomings and drawbacks associated with the prior art.

Another object of the present invention is to provide an alternative pipe and fitting coupling to conventional screw thread type connections.

A further object of the present invention is to provide a male element and a female element which interlock by means of a biased, bayonet style interlocking arrangement which maintains a rigid and leakproof pipe and fixture coupling.

Yet another object of the present invention is to provide the alternative coupling device with a consistent overlap at the interface between the pipe and fittings, in order that the length of piping assemblies can be more accurately predicted.

A still further object of the present invention is to provide an easily manipulatable coupling mechanism for attaching pipe and fittings which is economically manufactured and cost effective.

The present invention also relates to a coupling apparatus comprising a receiving element defining an axial bore having an annular groove; a retaining ring supported in the annular groove; an insertion element having a radially extending projection for engaging the retaining ring in the annular groove; the insertion element being axially inserted into the axial bore, at least partially passing through the retaining ring and the radially extending projection being received in the annular groove; and wherein the receiving element and the insertion element are rotated relative to one another and the radially extending projection is biased by the retaining ring to cause an end of the insertion element to bear on an inner surface in the axial bore of the receiving element.

The present invention also relates to a coupling apparatus for joining a pipe and a fitting along a central axis, the coupling apparatus comprising a male portion formed on the pipe and a female portion formed on the other of the pipe and the fitting; the male portion comprising an outer surface supporting a first projection and a second projection extending substantially perpendicular from the outer surface; the female portion having an axial bore defined by an inner wall about the main axis, and an annular groove formed in the inner wall; a retaining split ring supported in the annular groove of the female portion, the retaining split ring comprising a first arm and a second arm being joined to one another at respective first ends, and the first and second arms having respective spaced apart second ends; a first notch provided in the first arm and a second notch provided in the second arm of the retaining split ring permit passage of the first and second projections of the male portion past the retaining split ring and into the annular groove in the female element whereupon relative rotation between the male and female portions rotates the first and second projections in the annular groove and forces the first and second projections against the first and second arms of the split ring to bias an end of the male portion against a surface of the inner wall of the female portion.

The present invention utilizes a method of creating leaktight joints between tubing (including pipe) and fittings that does not rely on the use of screw threads. The male element, a pipe or a tube having one or more perpendicular projections thereon, is inserted into and held fast to a female element fitting receivably accepting the male element, and via a bayonet-style interlocking arrangement the male and female elements are interlockingly secured. The ability to forego the use of pipe threads enables a thinner walled, or lighter gauge, pipe as well as lighter gauge fittings to be used in appropriate circumstances.

The coupling is made by inserting the male element end of a pipe into the female element of a fitting, and applying a slight relative twist between both elements that causes the male and female elements to rotate in relation to one another until locking projections on the male element encounter detents in a special retaining ring of the female element. Leak-proof sealing is provided by an o-ring, or other elastic sealing device, placed in a groove within the female element.

BRIEF DESCRIPTION OF THE DRAWINGS

The invention will now be described, by way of example, with reference to the accompanying drawings in which.

DETAILED DESCRIPTION OF THE INVENTION

FIGS. 1A, 1B and 2A and 2B illustrate the female and male elements 7, 27 of the coupling apparatus 1, respectively. As is generally known in the art, in order to join a length of pipe or tubing, such as a tee, coupling, elbow or a valve body, it is necessary to provide one end of a pipe or tube with a male element, while providing the opposing end of a fitting, with a respective female element. Thus, by way of example, in order to join or couple a pipe and a tee, elbow, coupling or valve body together, the male element 27 of a pipe or tube 3 is connected with the female element 7 of a fitting, such as a coupling, tee, elbow or valve body 13.

In most cases a single length of pipe or tubing supports a male element 27 disposed on either end, to mate with female elements of a fitting. As this aspect of pipe fitting and design is relatively conventional in the art, and further realizing that the respective male and female parts of the coupling to be described in detail below could be utilized on the same or separate articles to be joined, whether the article is a pipe, valve or fitting, no further discussion is provided with respect thereto.

Figure 1A:
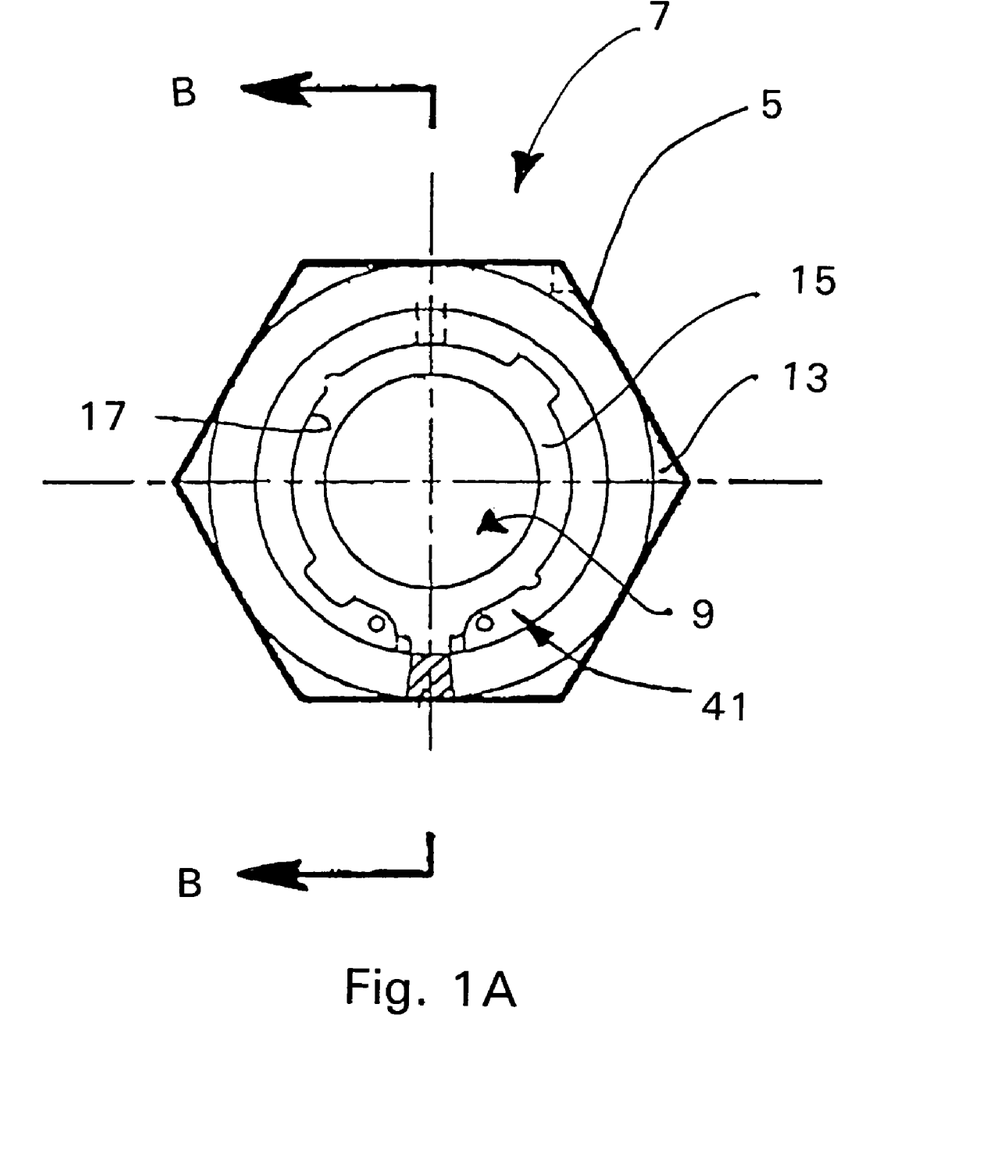
FIG. 1A illustrates a planar front view of the female element of the coupling apparatus in a fitting.
Figure 1B:
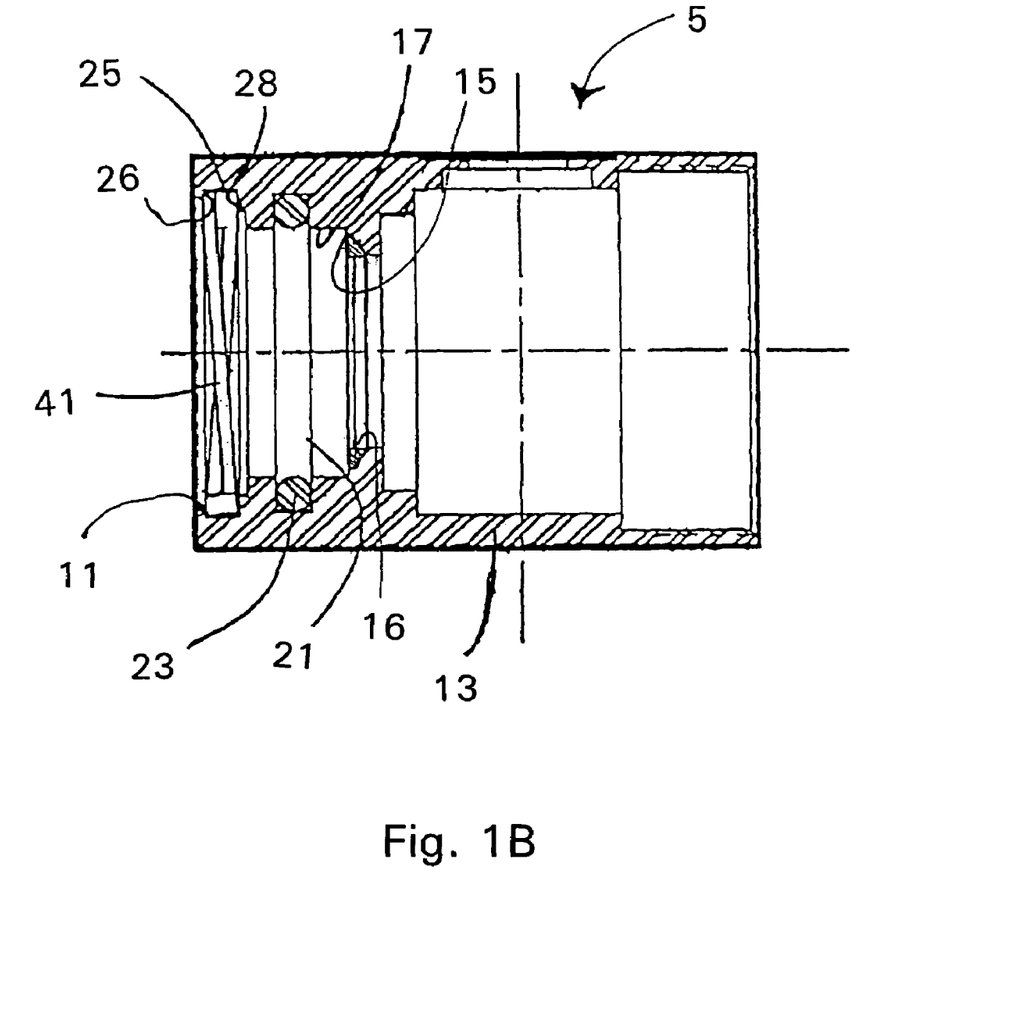
FIG. 1B shows a cross-sectional side view of the female element of the coupling apparatus.

Turning to FIG. 1A and 1B, the female element 7 of the coupling 1 will be described. By way of example, the female element 7 of the coupling 1 is formed as a bore 9 in a valve body 13 of hexagonal cross-section (arbitrarily chosen for this illustration, as the invention may be applied to any device or fitting). The female element consists of an inner lip 15 against which the square cut end 29 of the male element 27 will eventually abut. A face sealing element 16 may also be provided between the lip 15 and end 29 to seal this connection. The bore 9 is generally defined by an inner wall 17 which extends between the inner lip 15 and an opening 11 to the female element 7. Along the inner wall 17 is formed a generally circumferential seal groove 21. The seal groove 21 is circumferentially positioned along the wall 17 between the lip 15 and the opening 11, and within the seal groove 21 is positioned a gasket or seal 23 for radially contacting an outer surface 4 of the pipe 3 supporting the male element 27 when inserted in the female element 7. The seal 23 effectively provides a leak-proof radial seal between the outer surface 4 of the pipe 3, and the inner wall 17 of the female element 7.

Also formed in the inner wall 17 is an annular groove 25, spaced from the seal groove 21 and the lip 15 and adjacent and substantially defining the opening 11 of the female element 7. The annular groove 25 is defined by a back side 28 and a front side 26, the front side 26 being substantially adjacent the opening 11 to the bore 9, and wherein the front side 26 essentially defines the opening 11 to the bore 9. The front side 26 has an innermost diameter which is greater than an innermost diameter of the back side 28, this allows both the insertion of the retaining ring 41, as well as the passage of the male element 27, through the groove 25 and facilitates the retention and support of the ring 41 and male element 27 therein, a further discussion of which is provided below.

The opening 11 to the bore 9, which is essentially defined by the innermost diameter of the front side 26 of the groove 25, is configured to have a slightly smaller diameter than the bottom of the annular groove 25 and a slightly larger diameter than the innermost diameter of the back side 28. This structure of the opening 11 assists in axially and radially securing the separate retaining ring 41 to be confined in the annular groove 25 in bore 9. A further description of the retaining ring 41 is provided below.

Figure 2A:
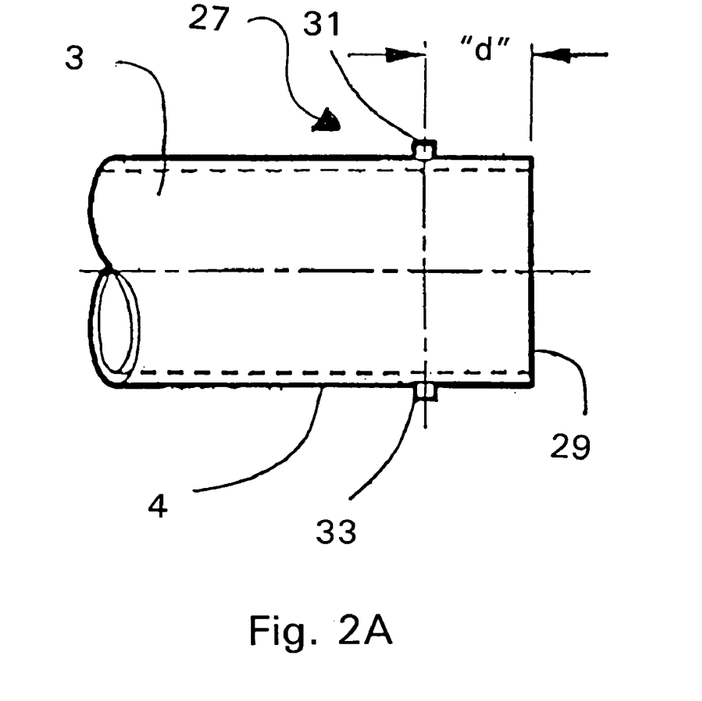
FIG. 2A is a side view of the male element of the coupling apparatus.
Figure 2B:
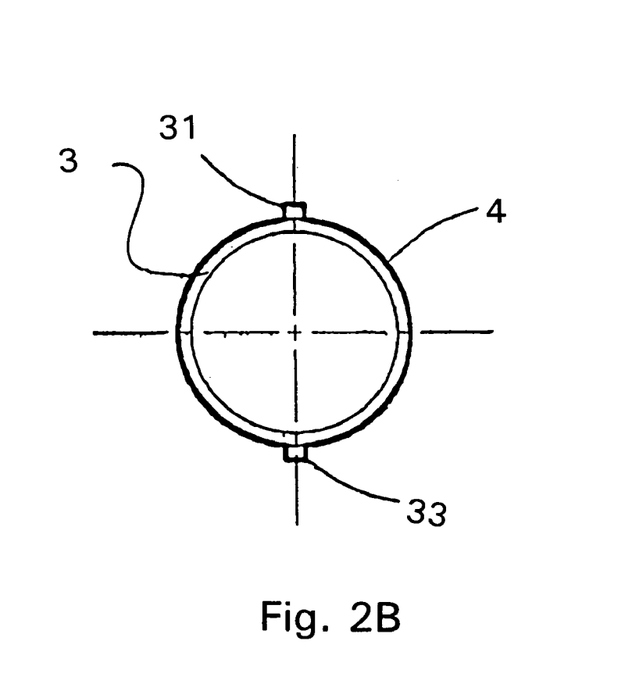
FIG. 2B illustrates a planar front view of the male element of the coupling apparatus.

FIGS. 2A and 2B depict the pipe or tube 3 having the male element 27 of the coupling device 1. The tube 3 has a squarely cut end 29, which will abut with the lip 15 once the separate elements are coupled. The male element 27 features at least one and preferably two projections 31, 33, more than two could be contemplated, adjacent, but spaced an axial distance d from the square cut end 29 of the tube 3. Most preferably the two projections 31, 33 comprise a first and a second diametrically opposed and radially extending projections 31, 33 from the outer wall 4 of the tube 3. These projections 31, 33, extend a radial distance less than the innermost diameter of the front side 26 of the female element, so they will fit past the front side 26 and into the annular groove 25.

This structure ensures that the projections will fit radially inside the annular groove 25 when the male and female elements 27, 7 are axially engaged, and in a manner such that the projections 31, 33 will rotate within the annular groove 25 when the male and female parts 27, 7 are relatively radially rotated with respect to one another to fully engage the coupling 1. The projections 31, 33 also contact the retaining ring 41 which provides a biasing force to secure the coupling 1, a further discussion of which is provided below.

Figure 3A:
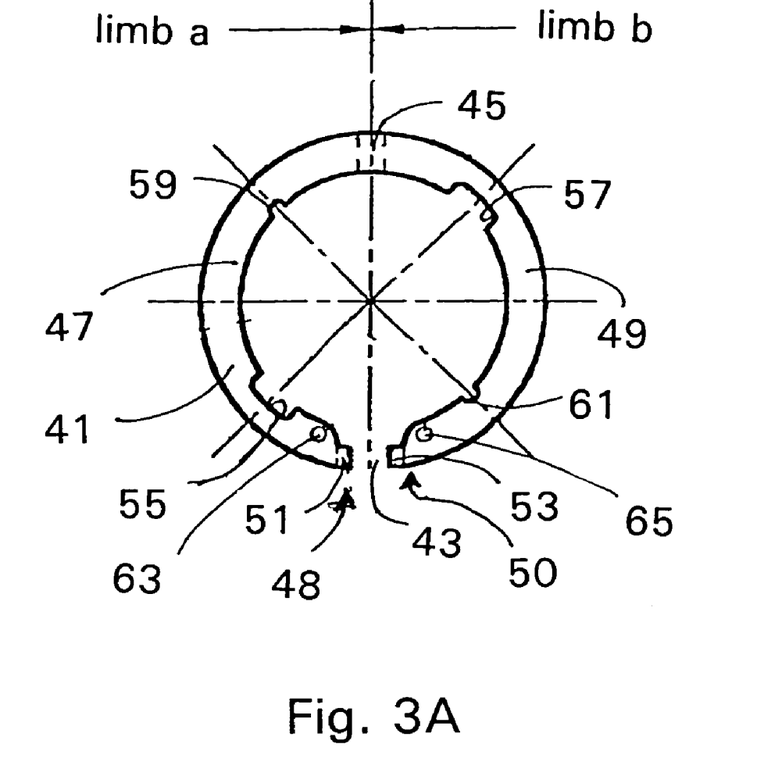
FIG. 3A illustrates retaining ring 41.
Figure 3B:
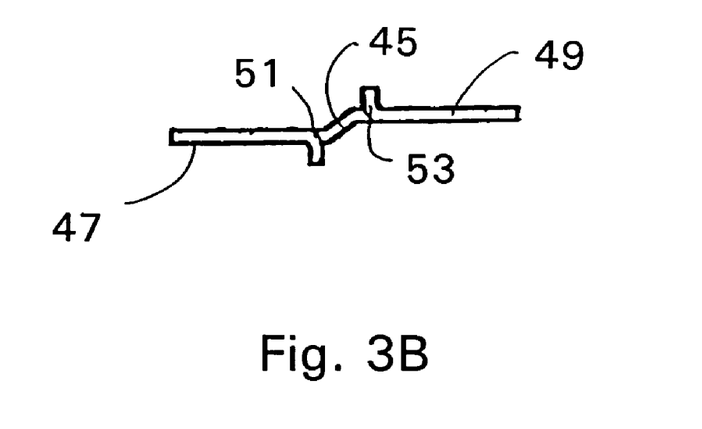
FIG. 3B shows a bottom view of retaining ring 41.
Figure 3C:
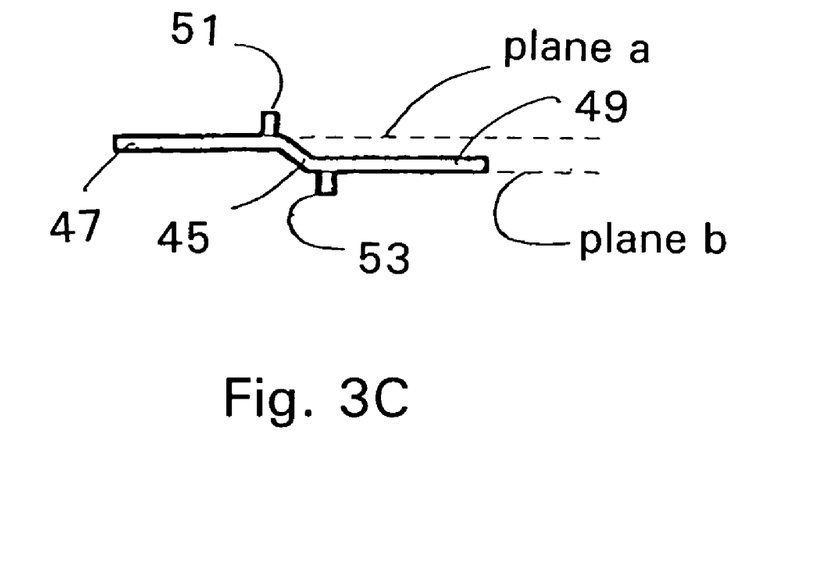
FIG. 3C illustrates a top view of retaining ring 41.
Figure 3D:
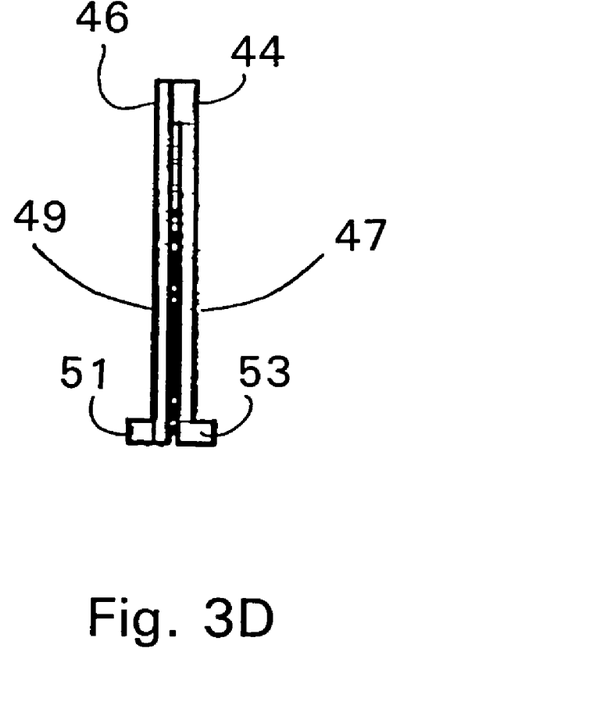
FIG. 3D illustrates a side elevational view of retaining ring 41.
Figure 4A:
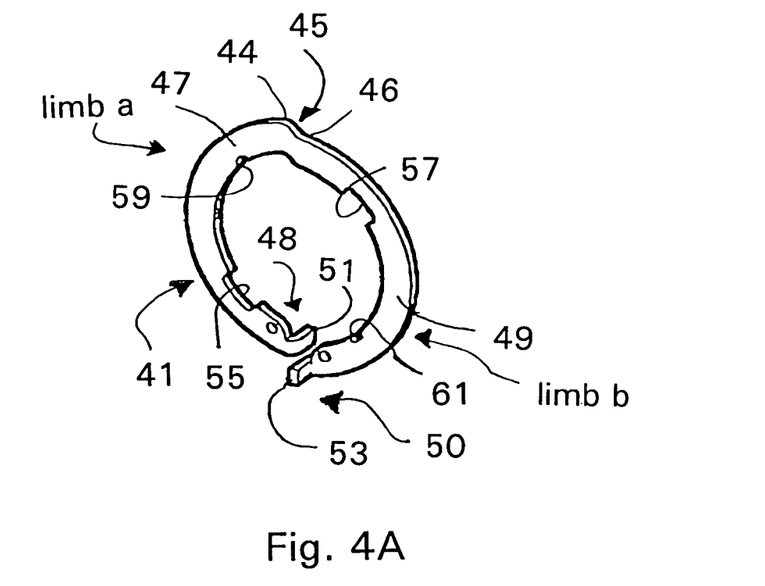
FIG. 4A shows retaining ring 41 in three-quarter perspective view in an unbiased position before installation.
Figure 4B:
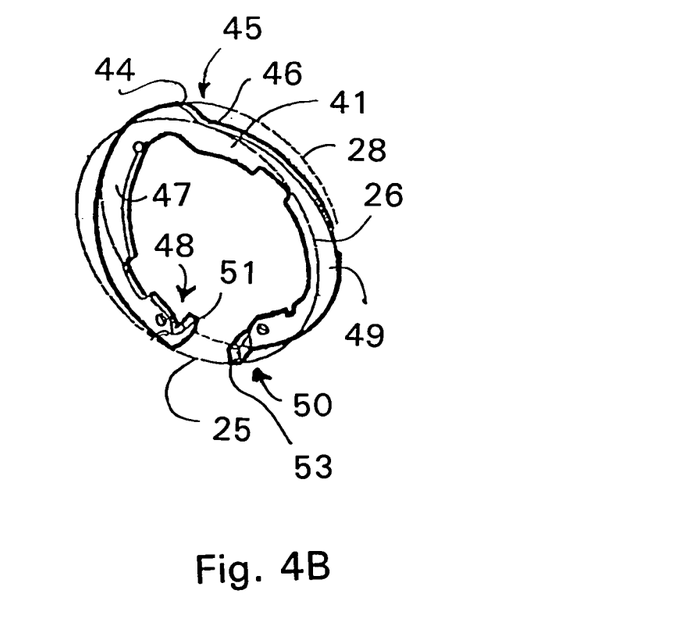
FIG. 4B shows after the installation in a biased position within annular groove 25 of the female element 1 (shown in ghost lines)

FIG. 3A illustrates retaining ring 41. FIGS. 3B–3D show the retaining ring 41 in a front view with auxiliary top, bottom and right hand side views respectively. FIGS. 4A and 4B show retaining ring 41 in three-quarter perspective view before and after installation in the annular groove 25 (shown in ghost lines) of the female part 1.

With reference to FIG. 3A, the front view of retaining ring 41: the continuity of ring 41 is interrupted by a space 43 which in conjunction with a diametrically opposing jog 45 divides the retaining ring 41 into two independently functioning "limbs", i.e., a first limb 47 and a second limb 49, that define planes "a" and "b" in the top view of FIG. 3C. The first and second limbs 47, 49 of the retaining ring 41 have respective first and second free ends 48, 50 defined by two formed tabs 51, 53 that project perpendicularly from the free ends of the limbs 47, 49 in opposing directions. In other words, each tab 51, 53 has a bend portion and an end portion where the tab is bent from the end of each limb 47, 49 to extend axially relative to the radial circumference of the retaining ring 41.

The first and second limbs 47, 49 of retaining ring 41 also each have a respective entry slot 55 and 57, that allow respective first and second projections 31, 33 of the male element 27 to pass through retaining ring 41 when the male element 27 is inserted into the female element 7. Also, a respective detent slot 59, 61 is formed in limbs 47, 49 to secure the male element 27 fast against further rotation after assembly and coupling of the male and female elements is complete. A first hole 63 and a second hole 65 are formed in limbs 47 and 49, respectively, near the free ends 48, 50 of the limbs 47, 49, substantially adjacent the space 43. Holes 63, 65 aid with the installation, or removal, of retaining ring 41 in the annular groove 25 by permitting use of a pliers-type tool with matching projections (not shown) that fit into the holes 63, 65 to manipulate the retaining ring 41.

Observing FIGS. 4A and 4B, this shows retaining ring 41 as if the free ends 48, 50 of the first and second limbs 47, 49 had been drawn together (by the aforementioned installation tool, or other device) in preparation for installation in the annular groove 25 of the female element 7. FIG. 4B depicts retaining ring 41 sprung into groove 25, the outer diameter of annular groove 25 being indicated with dashed lines.

When installed in groove 25, the first and second limbs 47, 49 of the retaining ring 41 are elastically distorted into essentially helical curves crossing the width of the annular groove 25 in opposing manners, in other words and by way of description, relative to the jog 45 between the first and second limbs 47, 49, the first limb 47 axially spans the annular groove 25 from the back side 28 to the front side 26 and the second limb 49 axially spans the annular groove 25 from the front side 26 to the back side 28. With reference to FIG. 4B, it is to be noted that the first limb 47 has a first knee portion 44 at jog 45 wherein the first limb 47 bears against the back side 28 of groove 25 (away from the viewer) as does the first tab 51 at the free end of the first limb 47. The second limb 49 has a second knee portion 46 at jog 45 which bears against the front side 26 of groove 25 (toward the viewer) and the second tab 53 at the free end of the second limb 49 also bears against the front side 26 of the groove 25.

After the seal 23 has been installed in seal groove 21 of the female element 7, the retaining ring 41 is inserted in the annular groove 25 using the aforementioned special tool to seat the retaining ring 41 in the groove 25. When retaining ring 41 is properly seated within the annular groove 25, the female element 7 may be swaged, for instance at the indented area shown in FIG. 1A adjacent annular groove 25 in order to prevent retaining ring 41 from rotating when the male and female elements 27, 7 are engaged and twisted. (The swage may be made before installation if sufficient clearance is provided).

Figure 5A:
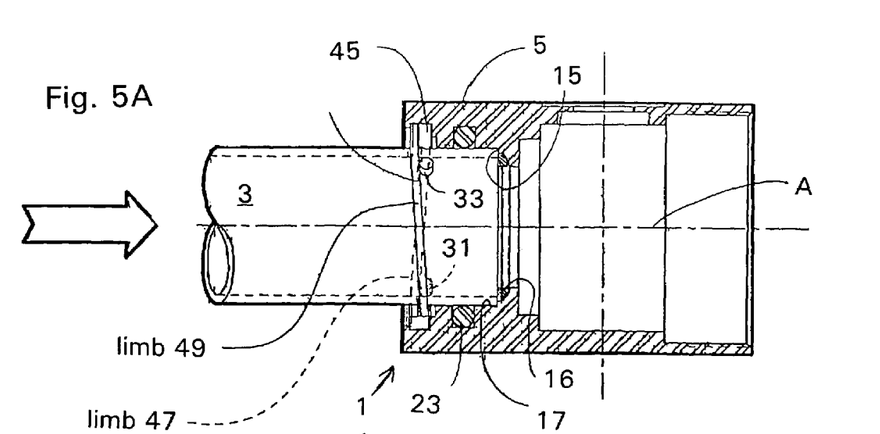
FIG. 5A illustrates the pipe coupling assembly and fitting during initial axial insertion and assembly of the coupling.
Figure 5B:
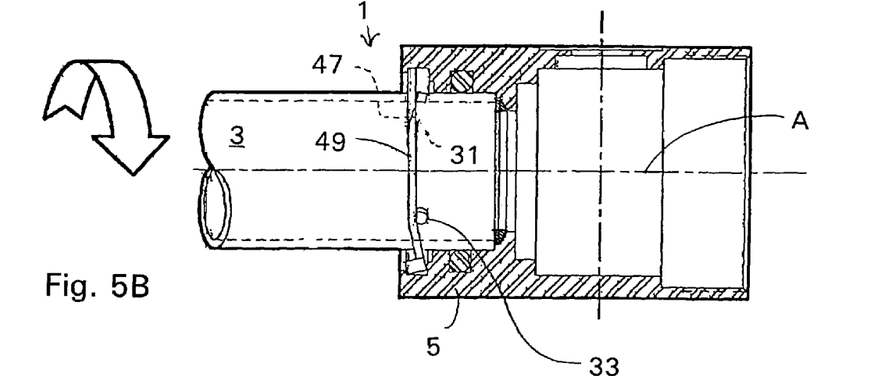
FIG. 5B shows the pipe coupling assembly and fitting after insertion and rotational interlocking of the relative male and female elements of the coupling.

FIGS. 5A and 5B illustrate the engagement and securing of the coupling apparatus 1 during assembly. FIG. 5A shows the cross section female element 7 of the valve body 13 after the first pipe or tube 3 having the male element 27 has been axially inserted into the bore 9 of the female element 7. As the male element 27 is being inserted into bore 9, the first and second projections 31, 33 pass freely through the respective first and second entry slots 55, 57 in the retaining ring 41. The forward progress of the pipe or tube 3 stops when the square cut end 29 comes into contact with the inner lip 15 at the end of bore 9 essentially completing a first step of the two-step process of coupling the tube and fitting. It is to be appreciated that a face sealing element 16, for example an elastomer washer or O-ring, may be inserted or fitted between the square cut end 29 and the inner lip 15 in order to provide a substantially leak tight seal between these two elements.

Further, in regards to the above described first step, the distance "d", axially locating the first and second projections 31, 33 of the male element 27 with relation to the square cut end 29 is chosen so as to avoid initial interference between projections 3 and retaining ring 41 or contact between the projections 31, 33 with surface 28 of the annular groove 25 when the pipe or tube 3 is axially inserted into the female element 7 in this first step.

The second step of the coupling assembly comprises the twisting i.e., rotation about the axis A, of the pipe or tube 3 relative to the valve body 5, (a clockwise rotation as shown by the arrow in FIG. 5B). During the relative rotation, the first and second projections 31, 33 of the male element 27 are situated between the retaining ring 41 and the back side 28 of the annular groove 25. As rotation continues the projections 31, 33 begin to interfere with the rear (right hand facing) surfaces of the limbs 47, 49 which forces pipe end 29 towards lip 15 of the female element 5. The interference between projections 31, 33 and the limbs 47, 49 elastically deforms the respective first and second limbs 47, 49 of the retaining ring 41 and thus, as the rotation continues even further, the projections 31, 33 are pushed or biased inwards (to the right in FIGS. 5A and 5B) by the arms 47 and 49 so that the square cut end 29 of the male end 27 is forced strongly against the inner lip 15 at the end of bore 9.

By this rotation, the projections 31, 33 force the free ends 48, 50 of each of the first and second limbs, 47, 49, as well as the second knee 46 of jog 45 relative to the second limb 49, against the front side 26 of groove 25 of female element 7. By way of further explanation, in addition to the second knee 46, the bent portion of tab 51 is pushed against front side 26 while the end portion of tab 53 is also pushed against front side 26. A load is imposed on front side 26 by these three contact points as the rotation of the projections 31, 33 continues to distort limbs 47, 49. The distortion of the limbs 47, 49 in turn provides an axially inward biasing force (a force to the right in FIGS. 5A and 5B) on the projections 31, 33 pushing the square cut end 29 of male element 27 strongly against the inner lip 15 at the end of the bore 9.

Complete assembly of the coupling 1 is accomplished when first and second projections 31, 33 of the male element 27 encounter the respective first and second detent notches 59 and 61 in retaining ring 41. The action of the detent notches 59, 61 with the projections 31, 33 serves to prevent over-rotation during assembly and also hold the male and female elements 27, 7 fast, unless substantial torque is applied to release the projections 31, 33 from the respective detents 59, 61.

Of course, the device can also be designed to assemble in the counterclockwise direction and disassemble in the clockwise direction, if desired, and the relative difficulty of uncoupling the device can be varied through attention to the proportions of projections 31, 33 and detent slots 59, 61.

Since certain changes may be made in the above described invention without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A coupling apparatus comprising:
   a receiving element defining an axial bore having an annular groove;
   a retaining ring supported in the annular groove;
   an insertion element having a radially extending projection for engaging the retaining ring in the annular groove;
   the insertion element being axially inserted into the axial bore, at least partially passing through the retaining ring and the radially extending projection being received in the annular groove;
   the receiving element and the insertion element are rotated relative to one another and the radially extending projection is axially biased by the retaining ring to cause an end of the insertion element to bear on an inner surface in the axial bore of the receiving element; and
   wherein the retaining ring forms a helical spring seated in the annular groove to axially bias the radially extending projection.

2. The coupling apparatus as set forth in claim 1, wherein the retaining ring comprises an inner circumference having a notch to allow passage of the radially extending projection past the retaining ring to be received in the annular groove.

3. The coupling apparatus as set forth in claim 1, wherein the helical spring provides an increasingly biased engagement between the receiving element and the insertion element as the receiving element and the insertion element are rotated radially relative to one another.

4. The coupling apparatus as set forth in claim 3, wherein the retaining ring comprises a knee portion and an opposing tab portion spaced from the knee portion which springably biases an engagement arm of the retaining ring across an axial width of the annular groove to form the helical spring.

5. A coupling apparatus for joining a pipe and a fitting along a central axis, the coupling apparatus comprising:
   a male portion formed on the pipe and a female portion formed on the other of the pipe and the fitting;
   the male portion comprising an outer surface supporting a first projection and a second projection extending substantially perpendicular from the outer surface;
   the female portion having an axial bore defined by an inner wall about the main axis, and an annular groove formed in the innerwall;
   a retaining split ring supported in the annular groove of the female portion, the retaining split ring comprising a first arm and a second arm being joined to one another at respective first ends, and the first and second arms having respective spaced apart second ends;
   a first notch provided in the first arm and a second notch provided in the second arm of the retaining split ring permit passage of the first and second projections of the male portion past the retaining split ring and into the annular groove in the female element whereupon relative rotation between the male and female portions rotates the first and second projections in the annular groove and forces the first and second projections against the first and second arms of the split ring to bias an end of the male portion against a surface of the inner wall of the female portion.

6. The coupling apparatus as set forth in claim 5 wherein the retaining ring further comprises a bent portion which connects the respective first ends of the first and second arms and separates the first and second arms of the retaining split ring into adjacent substantially parallel first and second planes.

7. The coupling apparatus as set forth in claim 6 wherein the second ends of the first and second arms have a respective first and second tab portion, the first tab portion extending perpendicular from the second end of the first arm and the second tab portion extending perpendicular from the second end of the second arm.

8. The coupling apparatus as set forth in claim 7 wherein the annular groove supporting the split ring is provided with a first and second wall, the first tab portion biasing a portion of the first arm away from the first wall, and the second tab portion biasing a portion of the second arm away from the second wall of the groove.

9. The coupling apparatus as set forth in claim 8 wherein the biased portions of the first and second arms define axially biasing ramps between the bent portion of the retaining ring and the first and second tab portion in the annular groove.

10. The coupling apparatus as set forth in claim 9 wherein the first and second projections of the male portion pass through the first and second notches in the retaining split ring and into the annular groove and upon relative radial rotation between the male and female portions the first and second projections are forced along the axially biasing ramps in the annular groove to securely couple the male and female portions to one another.

* * * * *